US007449708B2

(12) United States Patent
Jeong et al.

(10) Patent No.: US 7,449,708 B2
(45) Date of Patent: Nov. 11, 2008

(54) PAPER DETECTION APPARATUS AND PRINTING METHOD

(75) Inventors: Gi-cheol Jeong, Yongin-si (KR); Seock-deock Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 83 days.

(21) Appl. No.: 11/332,549

(22) Filed: Jan. 17, 2006

(65) Prior Publication Data

US 2006/0289813 A1 Dec. 28, 2006

(30) Foreign Application Priority Data

Jun. 28, 2005 (KR) ...................... 10-2005-0056072

(51) Int. Cl.
*G01N 21/86* (2006.01)

(52) U.S. Cl. ............................ 250/559.36; 250/559.29

(58) Field of Classification Search ................. 358/449, 358/489, 488, 474, 482, 483; 250/559.12-559.15; 271/111, 126, 127, 162, 164, 171
See application file for complete search history.

(56) References Cited

U.S. PATENT DOCUMENTS 4,559,451 A * 12/1985 Curl ...................... 250/559.36

FOREIGN PATENT DOCUMENTS

| | | |
|---|---|---|
| JP | 58-083873 | 5/1983 |
| JP | 58-087562 | 5/1983 |
| JP | 62-140954 | 6/1987 |
| JP | 05-077968 | 3/1993 |
| JP | 05-077968 | 8/1993 |
| JP | 06-190168 | 7/1994 |
| JP | 06-211381 | 8/1994 |
| JP | 2000-234911 | 8/2000 |
| JP | 2002-207085 | 7/2002 |

* cited by examiner

*Primary Examiner*—Thanh X Luu
*Assistant Examiner*—Tony Ko
(74) *Attorney, Agent, or Firm*—Roylance, Abrams, Berdo & Goodman, LLP

(57) ABSTRACT

Provided is a paper detection apparatus for detecting the size of a sheet of paper transferred along a paper transfer path, which includes a light source and an optical sensor. A plurality of light emitting optical fibers are located at a first side of the paper transfer path and receive light radiated by the light source and emit the received light to a plurality of positions in a widthwise direction of the paper. A plurality of light receiving optical fibers are located at a second side of the paper transfer path and guide the light emitted by the light emitting optical fibers toward the optical sensor. A determination unit detects the size of the paper based on the amount of light detected by the optical sensor.

21 Claims, 10 Drawing Sheets

PAPER DETECTION APPARATUS AND PRINTING METHOD

CROSS-REFERENCE TO RELATED PATENT APPLICATIONS

This application claims the benefit under 35 U.S.C. §119 (a) of Korean Patent Application No. 10-2005-0056072, filed on Jun. 28, 2005, in the Korean Intellectual Property Office, the entire disclosure of which is hereby incorporated by reference.

BACKGROUND OF THE INVENTION

1. Field of the Invention

The present invention relates to a paper detection apparatus. More particularly, the present invention relates to a printing method of a printer employing the same.

2. Description of the Related Art

Printers use sheets of paper having a variety of sizes (widths or lengths) as a recording medium and have one or more paper feed units for containing the paper. The paper feed unit includes a paper feed cassette for containing regular size paper and a multipurpose tray for containing irregular size paper. During printing, paper is drawn from the paper feed unit that contains the paper having a size fitting to the size of a print image. However, when the paper feed unit contains paper having a size different from that of the print image, for example, paper smaller than the print image, the image is partially omitted when the image is printed on the different size paper.

The paper is transferred based on a standard (transfer standard) of the center portion or a side edge in the widthwise direction. These standards are referred to as center feeding and side feeding. A printing start and end timing in the widthwise direction of a print unit must be controlled according to the transfer standard and width of the paper.

Accordingly, there is a need for an improved paper detection apparatus that detects different size paper for printing according to a printing method.

SUMMARY OF THE INVENTION

An aspect of embodiments of the present invention is to address at least the above problems and/or disadvantages and to provide at least the advantages described below. Accordingly, an aspect of embodiments of the present invention is to provide a paper detection apparatus which detects the size of a sheet of paper drawn from a paper feed unit and then transferred, and a printing method of a printer employing the same.

Exemplary embodiments of the present invention provide a paper detection apparatus which detects a transfer standard of a sheet of paper, and a printing method of a printer employing the same.

Exemplary embodiments of the present invention provide a paper detection apparatus which detects a skew of a sheet of paper, and a printing method of a printer employing the same.

According to an aspect of an exemplary embodiment of the present invention, a paper detection apparatus for detecting a size of a sheet of paper transferred along a paper transfer path includes a light source and an optical sensor. A plurality of light emitting optical fibers are located at a first side of the paper transfer path and receive light radiated by the light source and emit the received light to a plurality of positions in a widthwise direction of the paper. A plurality of light receiving optical fibers are located at the other side of the paper transfer path and guide the light emitted by the light emitting optical fibers toward the optical sensor, and a determination unit detects the size of the paper based on the amount of light detected by the optical sensor.

According to another aspect of an exemplary embodiment of the present invention, a paper detection apparatus for detecting a size of a sheet of paper transferred along a paper transfer path comprises a light source located at a first side of the paper transfer path. A plurality of optical sensors is located at a second side of the paper transfer path and receives light radiated by the light source. A detection unit detects the size of the paper based on an amount of light detected by the optical sensors.

According to another aspect of an exemplary embodiment of the present invention, a paper detection apparatus includes a feeding method detection sensor located close to a reference edge of a paper transfer path and detects whether a sheet of paper is transferred in a side feeding method or a center feeding method, according to whether the paper transferred along the paper transfer path is detected. A plurality of first sensors detects the size of the paper transferred in the side feeding method. A plurality of second sensors detects the size of the paper transferred in the center feeding method.

The feeding method detection sensor is preferably located outside a second edge of the paper having a maximum size and being transferable in the center feeding method, and the second edge is an edge of the paper close to the reference edge.

The plurality of first sensors are located inside a first edge of the paper transferred in the side feeding method, and the plurality of second sensors are located inside the second edge of the paper transferred in the center feeding method, and the first edge is an edge of the paper opposite to the reference edge.

The paper detection apparatus further includes a plurality of third sensors located outside the first edge of the paper transferred in the side feeding method, forming a pair with the first sensors. A plurality of fourth sensors is located outside the second edge of the paper transferred in the center feeding method, forming a pair with the second sensors. A skew of the paper is detected based on a change in the paper detection of the first, second, third, and fourth sensors, while the paper is transferred.

A distance from the first edge to the first and third sensors and a distance from the second edge to the second and fourth sensors is the same as an allowable amount of the skew of the paper.

The paper detection apparatus further includes at least one light source that radiates light onto a surface of the paper, wherein the feeding method detection sensor and the first, second, third, and fourth sensors are optical sensors located on a rear surface of the paper to detect the light.

According to another aspect of an exemplary embodiment of the present invention, a paper detection apparatus includes at least one light source that radiates light onto a surface of a sheet of paper, a feeding method detection optical fiber that has a light input portion that is located close to a reference edge of a paper transfer path on a rear surface of the paper, and a feeding method detection optical sensor connected to a light output portion of the feeding method detection optical fiber that detects whether the paper is transferred in a side feeding method or a center feeding method.

According to another aspect of an exemplary embodiment of the present invention, a printing method includes checking whether a sheet of paper is transferred in a side feeding method or a center feeding method, based on a detection of the paper by a feeding method detection sensor located close to a reference edge of a paper transfer path. The size of the paper that is transferred is detected. Print start and end timing is controlled in a widthwise direction of a printing unit based on the detected paper transfer method and the paper size.

The printing method further includes notifying a user of a difference between the detected paper size and the size of an image to be printed, through a user interface when the detected paper size is different from the size of an image to be printed.

The printing method further includes detecting the paper size based on the detection of the paper by a plurality of first sensors located inside a first edge of the paper that is opposite to the reference edge, when the paper is transferred in the side feeding method. The paper size is detected based on the detection of the paper by a plurality of second sensors located inside a second edge of the paper that is close to the reference edge when the paper is transferred in the center feeding method.

The printing method further includes detecting whether an amount of skew of the paper that is transferred exceeds the allowable amount of skew.

When the amount of skew of the paper exceeds the allowable amount of skew, printing that is being performed is stopped, and reprinting is performed.

Whether the amount of skew of the paper exceeds the allowable amount of skew is detected based on a change in the detection of the paper of a plurality of first and third sensors, located inside and outside of the first edge of the paper that is transferred in the side feeding method by being separated from the first edge as much as the allowable amount of skew, and a plurality of second and fourth sensors located inside and outside of the second edge of the paper that is transferred in the center feeding method by being separated from the second edge as much as the allowable amount of skew.

Other objects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
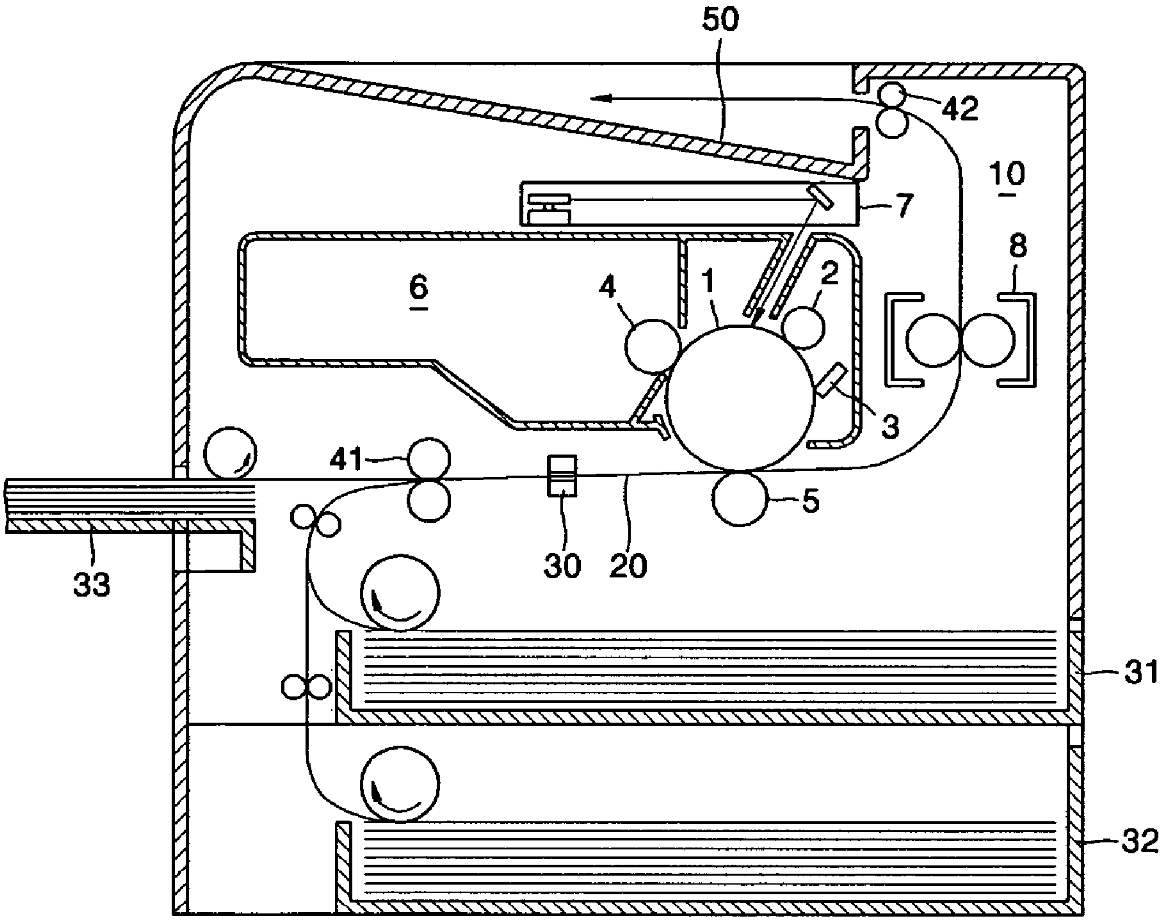
FIG. 1 illustrates an example of a configuration of a printer employing a paper detection apparatus and a printing method according to an exemplary embodiment of the present invention.

FIG. 1 illustrates an example of the configuration of a printer employing a paper detection apparatus and a printing method according to an exemplary embodiment of the present invention. The printer according to an exemplary embodiment of the present invention includes a printing unit 10 for printing an image on a sheet of paper in an electrophotographic method. The printing unit 10 includes a photosensitive drum 1, a charge roller 2, an exposure unit 7, a transfer roller 5, and a fuser 8. The photosensitive drum 1 has a photoconductive layer that is formed on the outer circumferential surface of a cylindrical drum. The charge roller 2 is an example of a charger that charges the photosensitive drum 1 to a uniform electric potential. Charge bias is applied to the charge roller 2. While rotating in contact with the outer circumferential surface of the photosensitive drum 1 or without contacting the same, the charge roller 2 supplies electric charges to the photosensitive drum 1 so that the outer circumferential surface of the photosensitive drum 1 has a uniform electric potential. Instead of the charge roller 2, a corona discharger (not shown) can be used as the charger.

The exposure unit 7 scans light corresponding to image information onto the photosensitive drum 1 to form an electrostatic latent image. A laser scanning unit (LSU) using a laser diode as a light source is used as the exposure unit 7. A development roller 4 in a contact development method rotates in contact with the outer circumferential surface of the photosensitive drum 1. In a non-contact development method, the development roller 4 rotates by separating a development gap from the outer circumferential surface of the photosensitive drum 1. The development gap is about tens or hundreds of microns. Development bias is applied to the development roller 4 to form a toner image by supplying toner accommodated in a toner chamber 6 to an electrostatic latent image formed on the photosensitive drum 1. The transfer roller 5 is located to face the photosensitive drum 1. Transfer bias is applied to the transfer roller 5 to transfer the toner image formed on the photosensitive drum 1 to paper. A cleaning blade 3 removes waste toner remaining on the outer circumferential surface of the photosensitive drum 1 after the toner image is transferred to the paper. The fuser 8 includes a pair of rollers rotating together by being pressed against each other at a predetermined pressure. A heating unit (not shown) to heat the toner image is provided at one of the rollers.

In the process of forming an image in the printer, configured as above, the charge roller 2 charges the outer circumferential surface of the photosensitive drum 1 to a uniform electric potential. When the exposure unit 7 scans light corresponding to the image information onto the photosensitive drum 1 that is rotating, the resistance of a portion onto which the light is scanned decreases so that electric charges adhering to the outer circumferential surface of the photosensitive drum 1 escape. Thus, a difference in electric potential is generated between a portion where the light is scanned and a portion where the light is not scanned, so that an electrostatic latent image is formed on the outer circumferential surface of the photosensitive drum 1. When the development bias is applied to the development roller 4, the toner accommodated in the toner chamber 6 adheres to the electrostatic latent image to form a toner image. The paper drawn from a paper feed unit 31, 32 or 33 is supplied to the printing unit 10 through a paper transfer path 20. A transfer roller 41 transfers the paper. The paper arrives at a transfer nip that is formed by the photosensitive drum 1 and the transfer roller 5, which face each other, timely when the leading end of the toner image formed on the photosensitive drum 1 arrives at the transfer nip. When the transfer bias is applied to the transfer roller 5, the toner image is transferred from the photosensitive drum 1 to the paper. As the paper with the transferred toner image passes through the fuser 8, the toner image is fixed to the paper by heat and pressure so that printing of the image is completed. The paper with the completed image is output by an output roller 42 to a tray 50 and stacked.

The printer, as shown in FIG. 1, includes a plurality of paper feed units 31, 32, and 33. The paper feed units 31 and 32 are cassettes for generally containing sheets of paper having a regular size such as B4, B5, A4, and A5. The paper feed units 31 and 32 selectively contain variety types of the regular size paper, according to a side feeding method or center feeding method by adjusting a paper guide (not shown) provided. The paper feed unit 33 is a multipurpose tray for containing irregular size paper as well as the regular size paper. The multipurpose tray is used to easily contain the irregular size paper when an image having a different size from the paper contained in the cassette type paper feed units 31 and 32. Power information on the sizes of the sheets of paper contained in the paper feed units 31, 32, and 33 is input, for example, through an interface program of a host computer or a user interface device (not shown) of the printer. The paper information is stored, for example, in a memory (not shown) of the printer. The printer prints an image by drawing a sheet of paper having a size fitting to the size of the image to be printed from one of the paper feed units 31, 32, and 33 based on the paper information stored in the memory.

When paper having a size different from the paper information stored in the memory is contained in the paper feed units 31, 32, and 33, a print defect can be generated. For example, although A4, B4, and B5 paper must be respectively contained in the paper feed units 31, 32, and 33, according to the paper information stored in the memory, it is assumed that B4, A4, and B5 paper are respectively contained in the paper feed units 31, 32, and 33. When an image having an A4 size is to be printed, a sheet of B4 paper is drawn from the paper feed unit 31, according to the paper information stored in the memory. In this case, since the paper is larger than the image, the omission of the image is not generated, but the paper is wasted. When an image having a B4 size is to be printed, a sheet of A4 paper is drawn from the paper feed unit 32, according to the paper information stored in the memory. In this case, since the image is larger than the paper, the omission of the image is generated.

Figure 2:
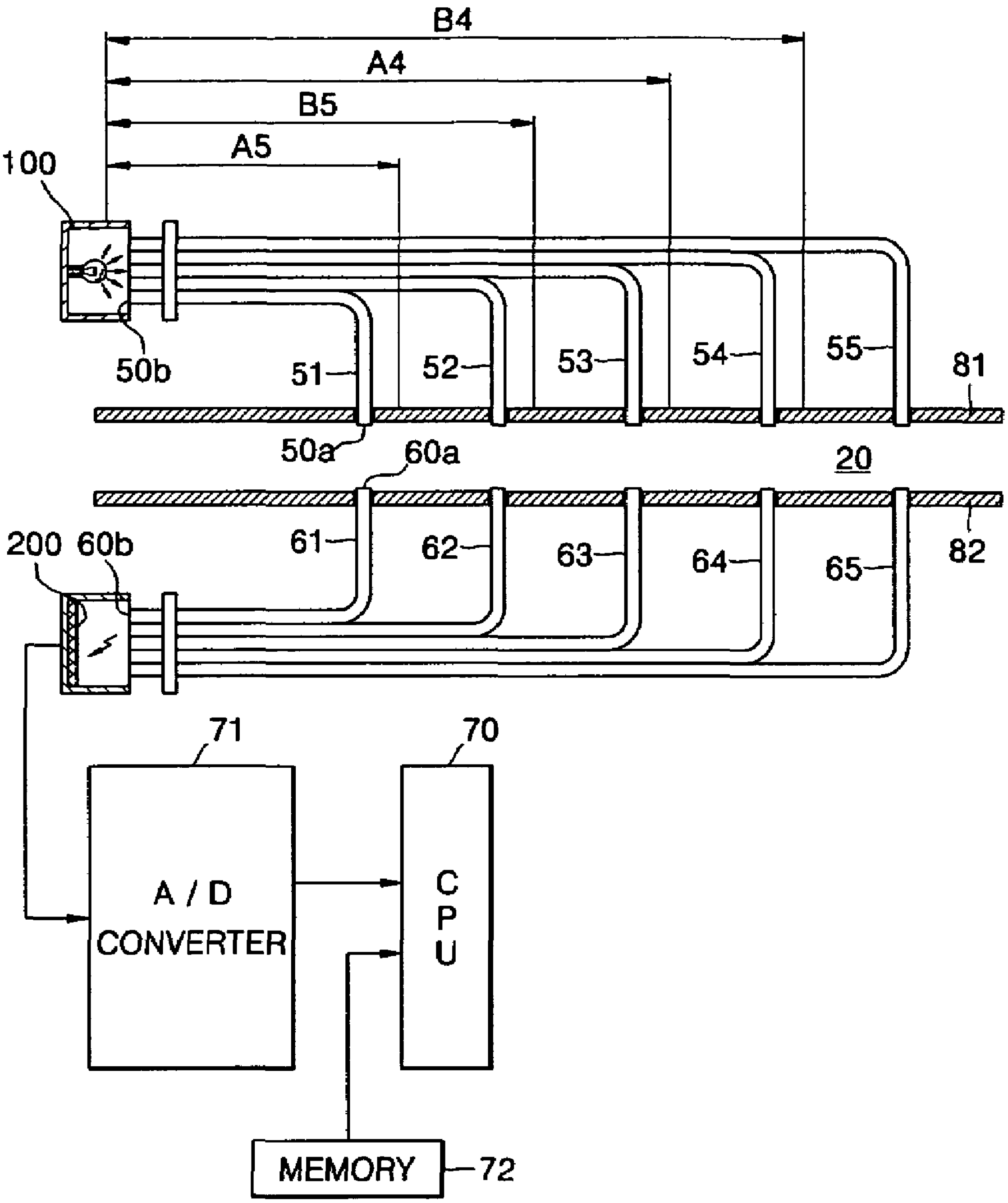
FIG. 2 illustrates a configuration of a paper detection apparatus according to an exemplary embodiment of the present invention.

To solve the above problem, a paper detection apparatus 30 is provided on the paper transfer path 20. Referring to FIG. 2, the paper detection apparatus 30 includes a light source 100, an optical sensor 200, light emitting optical fibers 51, 52, 53, 54, and 55, light receiving optical fibers 61, 62, 63, 64, and 65, and a determination unit 70. A first end portion 50*a* from which light is output of each of the light emitting optical fibers 51, 52, 53, 54, and 55 is arranged at a side of the paper transfer path 20 in the widthwise direction of the paper. The light source 100 radiates light to the to a second end portion 50*b* of each of the light emitting optical fibers 51, 52, 53, 54, and 55. The light receiving optical fibers 61, 62, 63, 64, and 65 are located at the other side of the paper transfer path 20. A first end portion 60*a* of each of the light receiving optical fibers 61, 62, 63, 64, and 65 is provided to face the first end portion 50*a* of each of the light emitting optical fibers 51, 52, 53, 54, and 55. The second end portion 60*b* of the light receiving optical fibers 61, 62, 63, 64, and 65 is connected to the optical sensor 200. First and second fixing members 81 and 82 are used to fix the first end portion 50*a* of each of the light emitting optical fibers 51, 52, 53, 54, and 55 and the first end portion 60*a* of each of the light receiving optical fibers 61, 62, 63, 64, and 65 to face one another.

Figure 3:
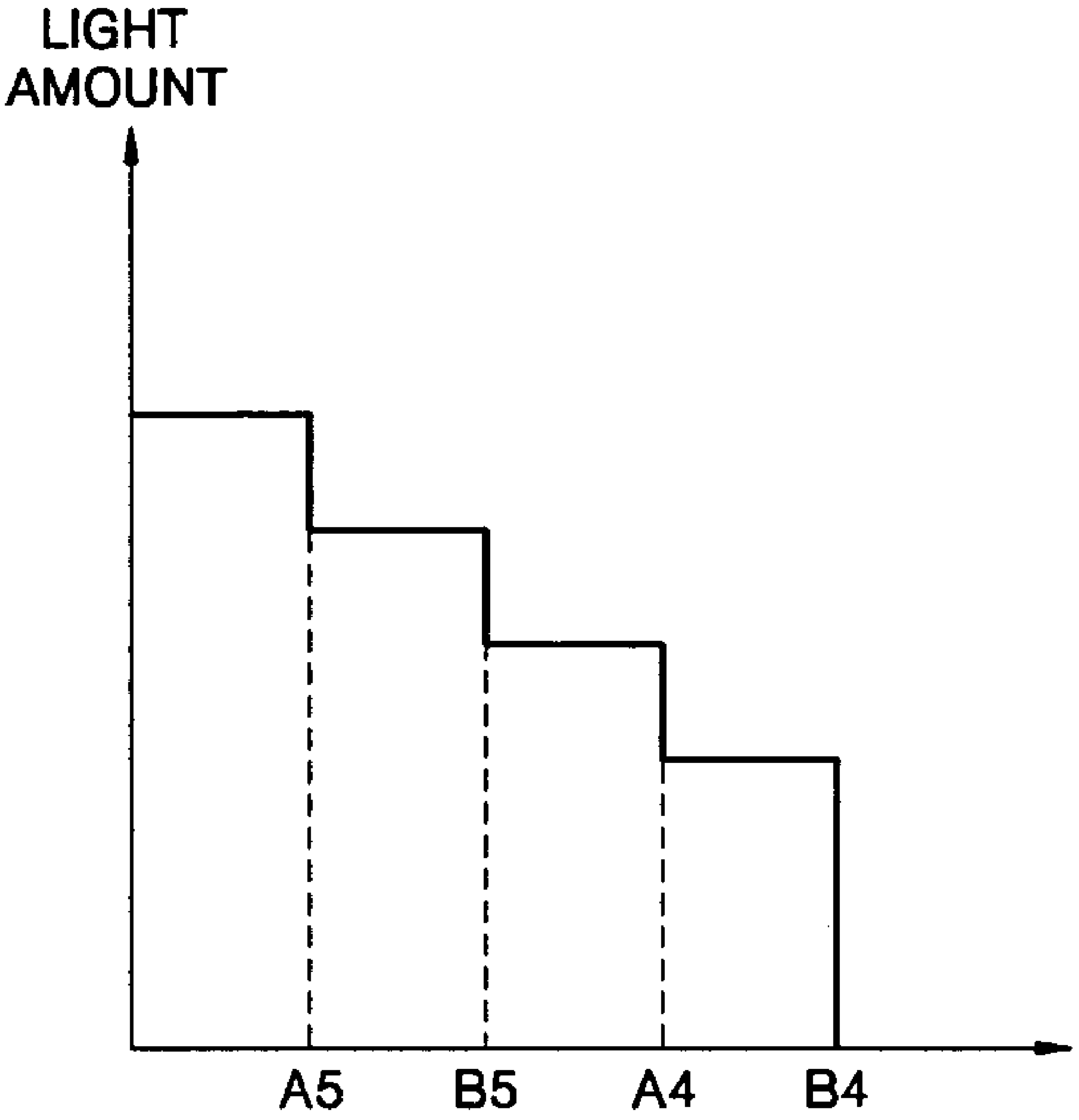
FIG. 3 is a graph showing a relationship between a size of paper and amount of light detected by an optical sensor.

When a sheet of A4 paper, for example, is transferred, the light emitted through the first end portion 50*a* of each of the light emitting optical fibers 51, 52, and 53 is blocked by the paper so that the light is prevented from inputting to the first end portion 60*a* of each of the light receiving optical fibers 61, 62, and 63. When a sheet of B4 paper, for example, is transferred, only the light emitted through the first end portion 50*a* of the light emitting optical fiber 55 is input to the first end portion 60*a* of the light receiving optical fiber 65. Thus, the amount of light incident on the optical sensor 200 varies according to the size of the paper that is transferred. For example, assuming that the light radiated by the light source 100 is uniformly distributed and input to the light emitting optical fibers 51, 52, 53, 54, and 55, the amount of light incident on the optical sensor 200 varies as shown in the graph of FIG. 3.

Figure 4:
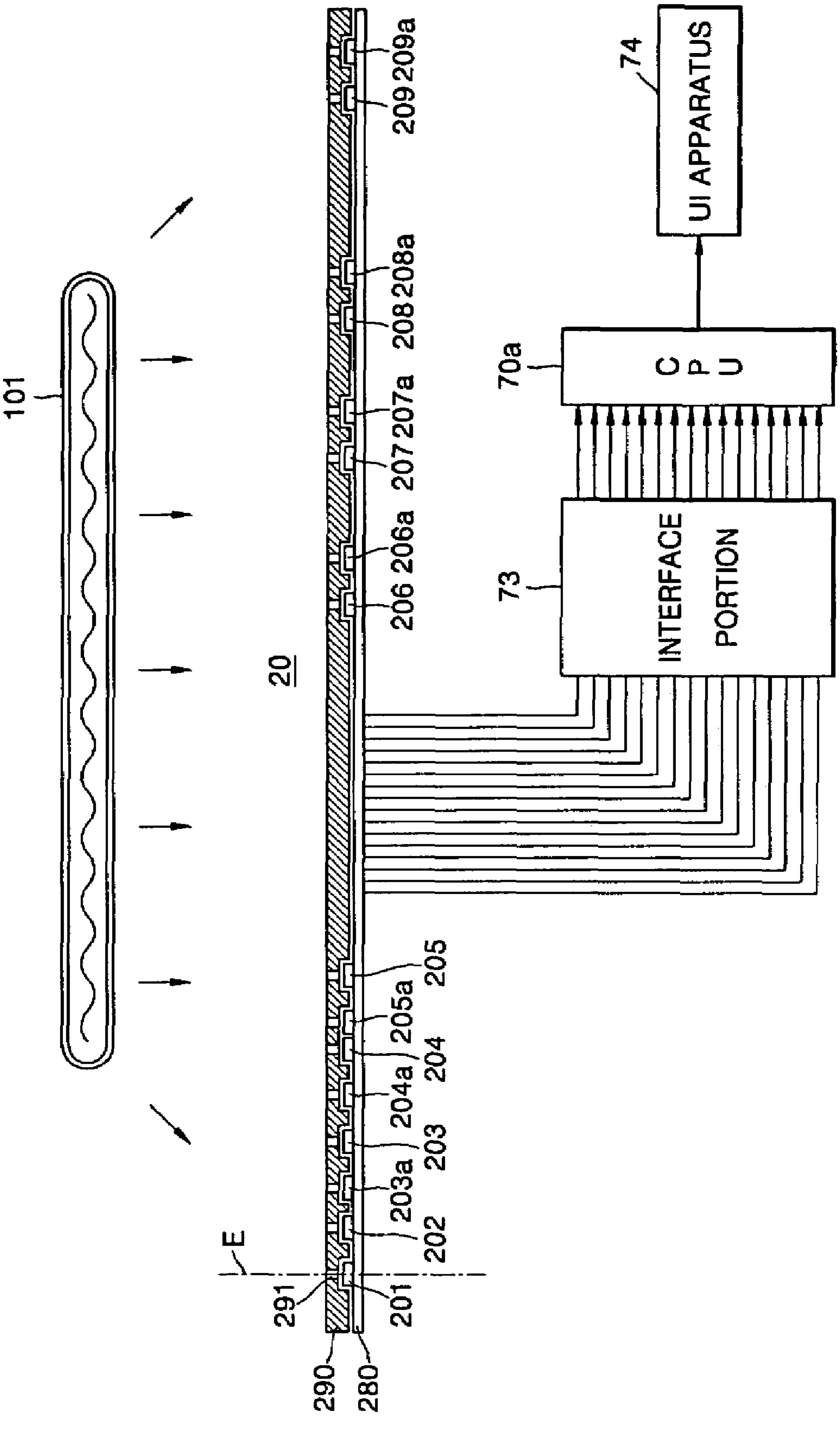
FIG. 4 illustrates the configuration of a paper detection apparatus according to an exemplary embodiment of the present invention.

In another exemplary embodiment of the present invention, the light source 100 and the optical sensor 200 can be arranged as shown in FIG. 4. In this case, a light source 101 that is lengthy in the widthwise direction of the paper transfer path 20 is used instead of the light source 100. Also, a plurality of optical sensors 201 through 209 that are arranged on a PCB 280 in the widthwise direction of the paper is used instead of the optical sensor 200.

Figure 8:
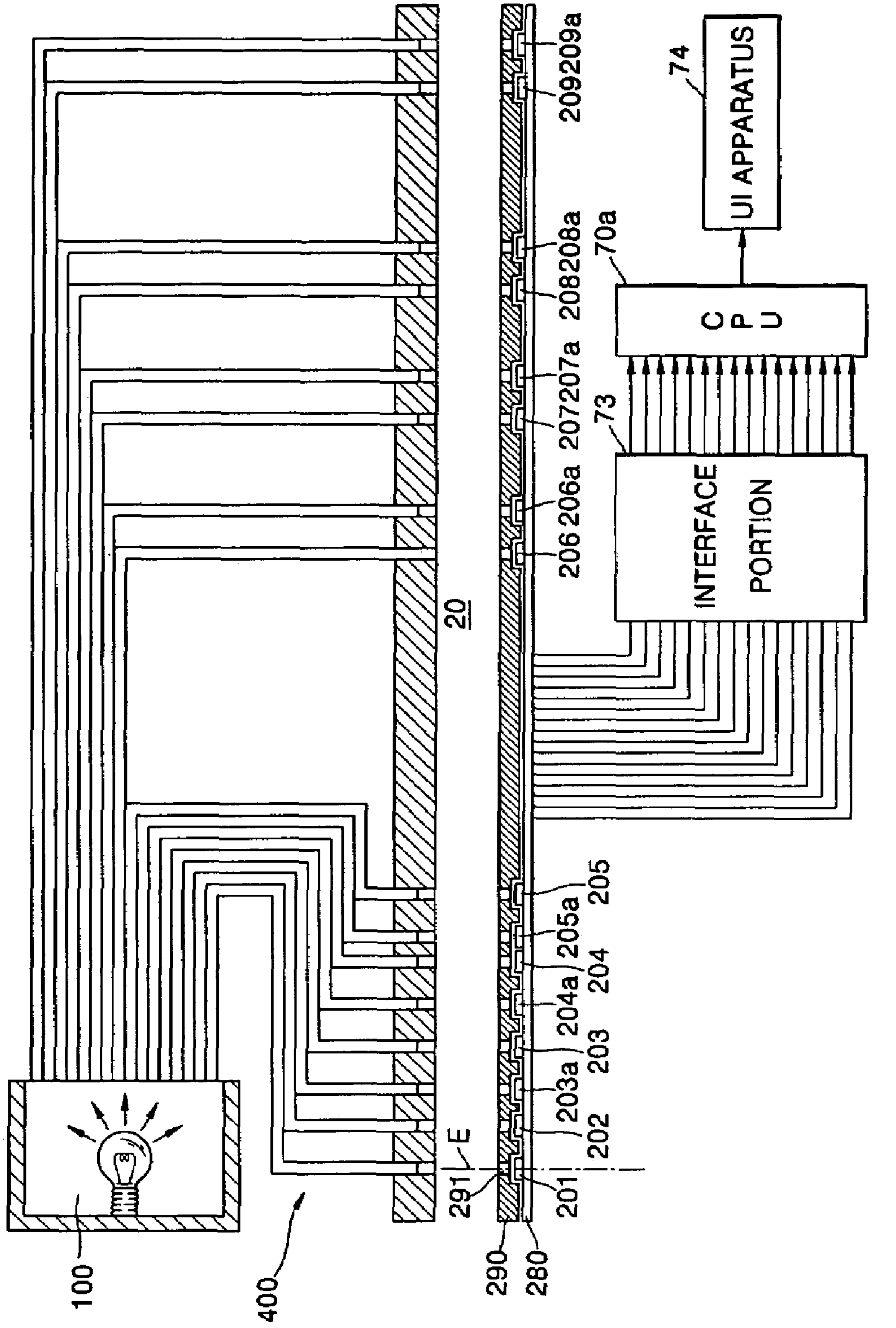
FIGS. 8 through 10 illustrate the configurations of paper detection apparatuses according to an exemplary embodiment of the present invention.

In yet another exemplary embodiment of the present invention, a light emitting optical fiber 400 for guiding the light radiated by the light source 100 to a plurality of optical sensors 201-209 is provided as shown in FIG. 8.

The determination unit 70, for example, is a central processing unit (CPU) that controls a printing process of the printer. The determination unit 70 detects the width of the paper that is transferred, based on the amount of light detected by the optical sensors 200 or 201-209. For example, the optical sensors 200 or 201-209 output a light amount signal proportional to the detected light amount in a form of a voltage signal or current signal. The light amount signal is converted by an A/D converter 71. A digital value of the light amount signal according to the size of the paper is preset in the memory 72 as a reference value. The determination unit 70 compares the light amount value and the reference value to determine the size of the paper that is transferred. It is obvious for those skilled in the art to directly compare the light amount signal that is analog and the preset reference signal that is analog as well.

According to the above-described paper detection apparatus, the size of the paper can be determined by using a single light source 100 and a single optical sensor 200. Since the optical sensor 200 or 201-209 having a small angular range of light detection can be used, and a light source having a relatively small light amount can be used as the light source 100, the cost of the paper detection apparatus 30 can be lowered.

Also, since there is no limit in the installation of the light source 100 and the optical sensor 200, the printer can be designed with more freedom.

FIG. 4 illustrates the configuration of a paper detection apparatus according to an exemplary embodiment of the present invention. Referring to FIG. 4, a plurality of sensors 201-209 are arranged to face the rear surface of paper in the widthwise direction of the paper. In an exemplary embodiment of the present invention, the sensors 201-209 are optical sensors and installed, for example, on the PCB 280. The light source 101 radiates light onto the surface of the paper that is transferred along the paper transfer path 20. An optical path 291, corresponding to the sensors 201-209, is provided on a light guide member 290. The light by the light source 101 is incident on the sensors 201-209 through the optical path 291. The sensors 201-209 output an electric signal according to whether light is detected. The electric signal is converted by an interface portion 73 into an ON signal when the light is detected or an OFF signal when the light is not detected and is input to a determination unit 70*a*.

Figure 5:
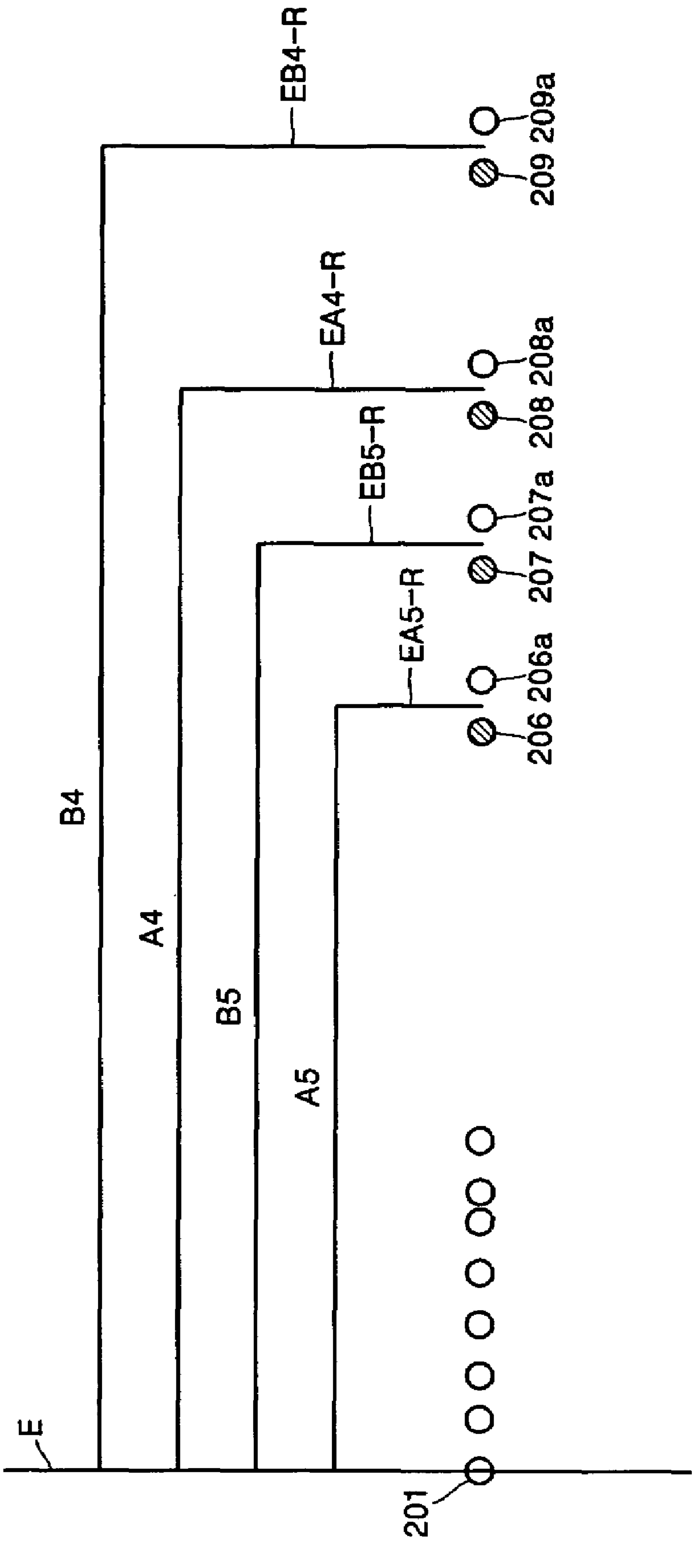
FIG. 5 illustrates the arrangement of a first sensor and third sensor when the paper is transferred in a side feeding method.
Figure 6:
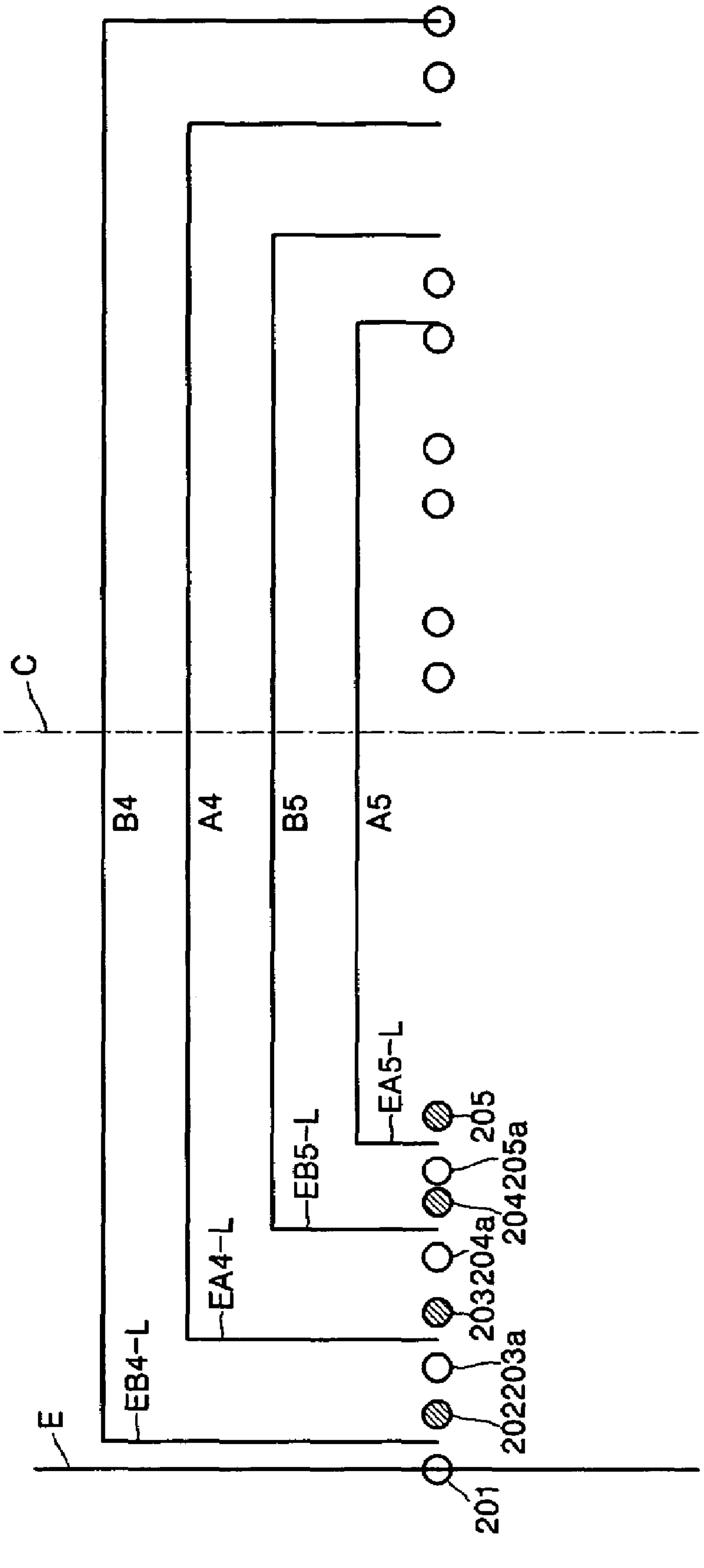
FIG. 6 illustrates the arrangement of a second sensor and fourth sensor when the paper is transferred in a center feeding method.

In the process of detecting paper in the printer, configured as above, and the printing method according to an exemplary embodiment of the present invention, when a sheet of paper is drawn from one of the paper feed units 31, 32, and 33, the determination unit 70*a* determines whether the paper transfer method is either a side feeding method or a center feeding method. The determination of the side feeding method or center feeding method is based on a signal output from a feeding method detection sensor 201 that is located close to a reference edge E. That is, for the side feeding method, the feeding method detection sensor 201 does not detect light while the feeding method detection sensor 201 detects light for the center feeding method. Thus, when the signal output from the feeding method detection sensor 201 is in an OFF state, the determination unit 70*a* determines the present state as the side feeding method as shown in FIG. 5. When the signal output from the feeding method detection sensor 201 is in an ON state, the determination unit 70*a* determines the present state as the center feeding method, as shown in FIG. 6. The feeding method detection sensor 201 is located outside a second edge EB4-L that is the reference edge E of the largest paper that can be transferred in the center feeding method, that is a B4 paper in the present exemplary embodiment.

Next, the determination unit 70*a* determines the size of the paper. In the present exemplary embodiment, a case of determining the paper size such as B4 (257×360 mm), A4 (210×297 mm), B5 (180×257 mm), and A5 (148.5×210 mm) is described. The sensors 202-209 are divided into first sensors 206, 207, 208, and 209 and second sensors 202, 203, 204, and 205. The first sensors 206-209 detect the size of the paper when the paper is transferred in the side feeding method. The second sensors 202-205 detect the size of the paper when the paper is transferred in the center feeding method.

When the paper is transferred in the side feeding method, referring to FIG. 5, the paper is transferred based on the reference edge E of the paper transfer path 20 so that the first sensors 206-209 are respectively located inside first edges EA5-R, EB5-R, EA4-R, and EB4-R. When an A5 paper is transferred, the first sensor 206 does not detect light. Thus, when the feeding detection sensor 201 is in an OFF state, the first sensor 206 is in an OFF state. When the remaining first sensors 207, 208, and 209 are in an ON state, the determination unit 70*a* determines that the A5 paper is transferred based on the reference edge E. Table 1 below shows the sizes of paper according to the states of the first sensors 206-209.

TABLE 1

| | | First sensors | | | | |
|---|---|---|---|---|---|---|
| | | 206 | 207 | 208 | 209 | Paper size |
| Sensor | 206 | OFF | ON | ON | ON | A5 |
| | 207 | OFF | OFF | ON | ON | B5 |
| | 208 | OFF | OFF | OFF | ON | A4 |
| | 209 | OFF | OFF | OFF | OFF | B4 |

In the detection of the paper size in the center feeding method, referring to FIG. 6, to detect the type of paper that is transferred, the second sensors 202, 203, 204, and 205 are located inside the second edges EB4-L, EA4-L, EB5-L, and EA5-L, respectively. When the A5 paper is transferred, the second sensor 205 does not detect light. Thus, when the feeding detection sensor 201 is in an ON state, the second sensor 205 is in an OFF state. When the remaining second sensors 202, 203, and 204 are in an ON state, the determination unit 70*a* determines that the A4 paper is transferred based on the center portion C. Table 2 below shows the size of paper according to the states of the second sensors 202-205.

TABLE 2

| | | Second sensors | | | | |
|---|---|---|---|---|---|---|
| | | 202 | 203 | 204 | 205 | Paper size |
| Sensor | 202 | ON | ON | ON | Off | A5 |
| | 203 | ON | ON | OFF | OFF | B5 |
| | 204 | ON | OFF | OFF | OFF | A4 |
| | 205 | OFF | OFF | OFF | OFF | B4 |

When the paper size does not match the size of an image to be printed, the determination unit 70*a* notifies a user through a user interface (UI) apparatus 74. The UI apparatus 74, for example, is software operating on a host computer, a liquid crystal display (not shown) provided in the printer, or an alarm buzzer. The user checks the paper feed units 31, 32, and 33, and place paper having an appropriate size in the paper feed units 31, 32, and 33. Also when the paper size does not match the size of an image to be printed, the determination unit 70*a* may draw the paper and retry the step for detecting the paper transfer method and the paper size. During the retry step, paper can be drawn from the same paper feed unit as used in the precedent step or from different paper feed units. If the paper size does not match the size of an image to be printed, the determination unit 70*a* notifies the user through the UI apparatus 74, even though the retry step is repeated for a preset frequency, for example, the number of the paper feed units.

When the paper size and the paper transfer method are detected from the above steps, a print start and end timing of the printing unit 10 in the widthwise direction of the paper is controlled based on the detected information. In the electrophotographic printer shown in FIG. 1, the scan start and end timing of the exposure unit 7 in a main scanning direction (the widthwise direction of the paper) is controlled. Although not shown in the drawings, for inkjet printers, ink injection start and end timing of an inkjet head that is reciprocated in the main scanning direction is controlled. Likewise, by controlling the print start and end timing in the widthwise direction of the paper, based on the paper transfer method and the paper size, deterioration of printing due to the omission of an image can be prevented.

The skew of the paper can be generated when the paper is transferred. The paper detection apparatus, according to an exemplary embodiment of the present invention has a characteristic feature of detecting the skew of the paper. Referring to FIGS. 4, 5, and 6, there are third sensors 206*a*, 207*a*, 208*a*, and 209*a* that form a pair with the first sensors 206, 207, 208, and 209, and fourth sensors 201, 203*a*, 204*a*, and 205*a* that form a pair with the second sensors 202, 203, 204, and 205. In the present exemplary embodiment, the feeding method detection sensor 201 also works as a sensor to detect the skew of the B4 paper that is transferred in the center feeding method. The third sensors 206*a*, 207*a*, 208*a*, and 209*a* are respectively located outside the first edges EA5-R, EB5-R, EA4-R, and EB4-R. The fourth sensors 201, 203*a*, 204*a*, and 205*a* are respectively located outside the second edges EB4-L, EA4-L, EB5-L, and EA5-L. The interval between the first and third sensors 206-209 and 206*a*-209*a* and the first edges EA5-R, EB5-R, EA4-R, and EB4-R, and the interval between the second and fourth sensors 202-205 and 201, 203*a*-205*a* and the second edges EB4-L, EA4-L, EB5-L, and EA5-L, are the same as the allowable maximum skew amount W.

Figure 7:
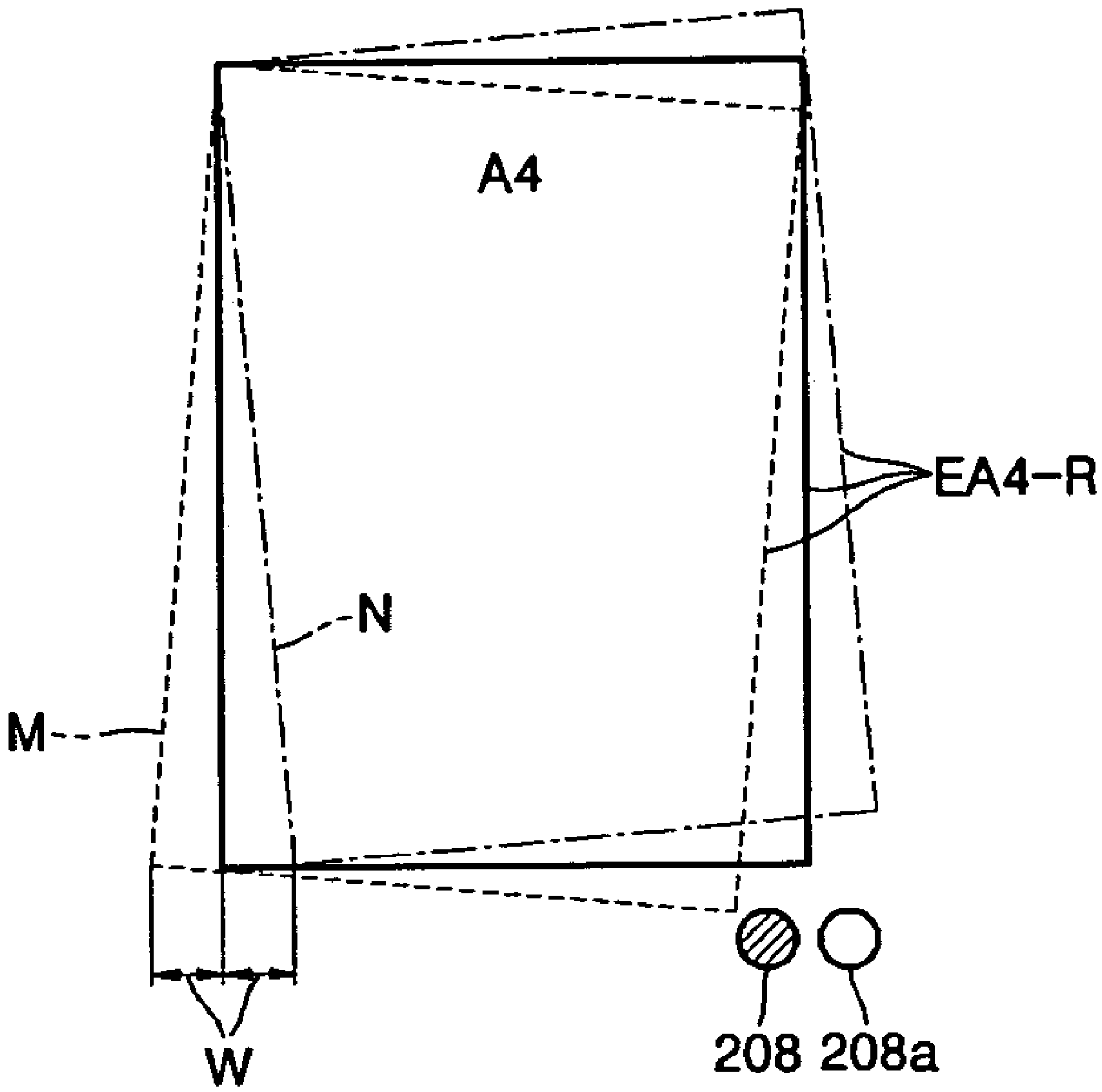
FIG. 7 illustrates a procession of the paper at an angle.

While the paper is transferred, the skew of the paper can be generated in two forms of M and N indicated by a dotted line and a one-dot chain line of FIG. 7. For example, when the A4 paper is transferred in the side feeding method, the first sensor 208 is in the OFF state while the third sensor 208*a* is in the ON state. When there is no skew, that is, an actual amount of skew does not exceed the allowable maximum skew amount W, the first sensor 208 and the third sensor 208*a* maintain the OFF and ON states until printing is completed. When the first sensor 208 is changed to the ON state while the paper is transferred, the determination unit 70*a* determines that the skew of the paper in the form M has occurred beyond the allowable maximum skew amount W. When the third sensor 208*a* is changed to the OFF state while the paper is transferred, the determination unit 70*a* determines that the skew of the paper in the form N has occurred beyond the allowable maximum skew amount W. When the transfer of the paper is completed, the first sensor 208 is changed to the ON state. However, since the determination unit 70*a* already recognizes that the paper is being transferred, the time when the transfer of the A4 paper is completed can be known considering the paper transfer speed of the transfer roller 41. Thus, when the states of the first and third sensors 208 and 208*a*, respectively, change within the above time period, the determination unit 70*a* can determine that the skew of the paper has occurred.

When the skew of the paper is out of the allowable maximum skew amount, the printing unit 10 stops printing and the paper being printed is discharged by the output roller 42. The printing process can be re-performed by drawing paper again from the paper feed units 31, 32, and 33. Alternatively, a message requesting confirmation of the paper stacking state of the paper feed units 31, 32, and 33 can be displayed through the UI apparatus 74.

Figure 9:
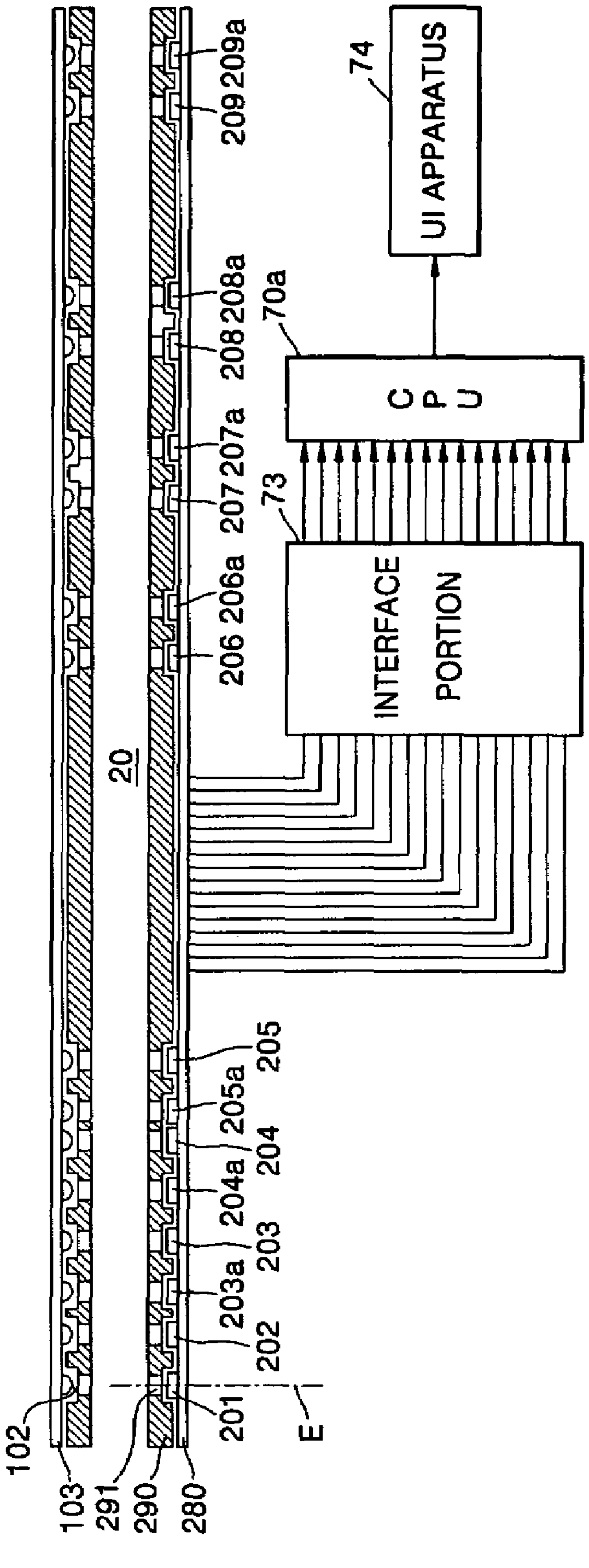
Figure 10:
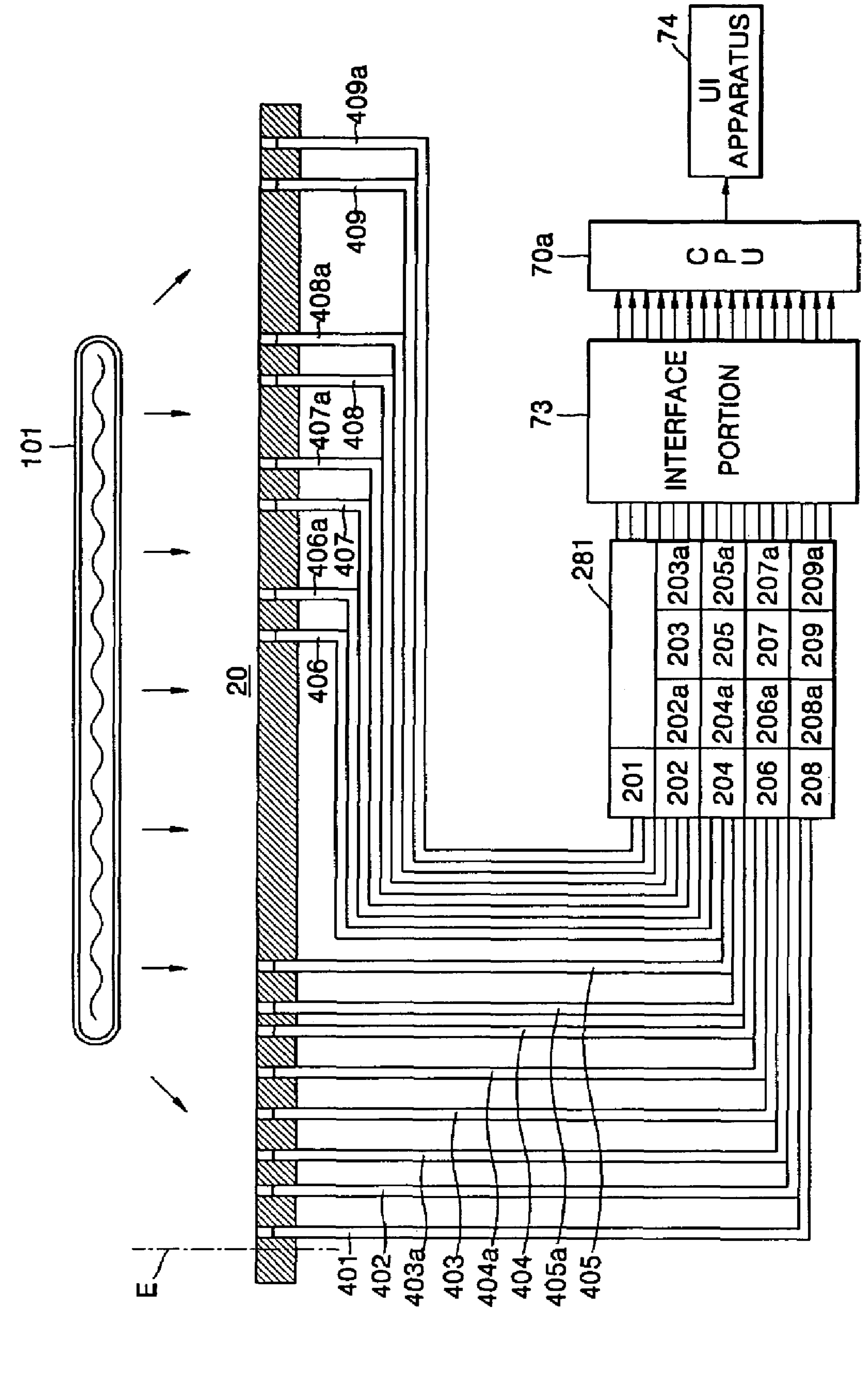

FIGS. 8 through 10 show paper detection apparatuses according to exemplary embodiments of the present invention. Referring to FIG. 8, a plurality of optical fibers 400 is illustrated. Each of the optical fibers 400 have a first end connected to the light source 100 and a second end portion located to face the feeding method detection sensor 201 and the first, second, third, and fourth sensors 202-209, 201, and 203*a*-209*a*.

Referring to FIG. 9, a plurality of light sources 102, for example, LEDs, are located to face the feeding method detection sensor 201 and the first, second, third, and fourth sensors 202-209, 201, and 203*a*-209*a*. The light sources 102 are arranged on a PCB 103. As a modified example, the light sources 102 shown in FIG. 9 can be arranged at end portions of the optical fibers 400 shown in FIG. 8. In this case, the light source 100 does not need to be arranged as shown in FIG. 9.

Referring to FIG. 10, the feeding method detection sensor 201 and the first, second, third, and fourth sensors 202-209, 201, and 203*a*-209*a* are arranged on a PCB 281. A light input portion of an optical fiber 401 for detecting a feeding method is located on a rear surface of paper close to the reference edge E of the paper transfer path 20, while a light output portion is connected to the feeding method detection sensor 201. Light input portions of first optical fibers 406-409 are respectively located inside the first edges EA5-R, EB5-R, EA4-R, and EB4-R, while light output portions are connected to the first sensors 206-209. Light input portions of second optical fibers 402-405 are respectively located inside the second edges EB4-L, EA4-L, EB5-L, and EA5-L, while light output portions are connected to the second sensors 202-205. Light input portions of third optical fibers 406*a*-409*a* are respectively located outside the first edges EA5-R, EB5-R, EA4-R, and EB4-R, while light output portions are connected to the third sensors 206*a*-209*a*. Light input portions of fourth optical fibers 401 and 403*a*-405*a* are respectively located outside the second edges EB4-L, EA4-L, EB5-L, and EA5-L, while light output portions are connected to the fourth sensors 202*a*-205*a*. In the present exemplary embodiment, the feeding method detection sensor 201 also works as a sensor to detect the skew of a B4 paper that is transferred in the center feeding method. Thus, the feeding method detection optical fiber 401 also works as an optical fiber to detect the skew of the B4 paper.

As a modified example, the light source 100 shown in FIG. 8 and the optical fiber (a fifth fiber) 400 can be used instead of the light source 101 shown in FIG. 10. In this case, the light source 102 shown in FIG. 9 can be employed instead of the light source 100.

According to the paper detection apparatuses shown in FIGS. 8 through 10, the paper size and skew detection errors can be prevented, since the light is not simultaneously detected by the neighboring optical sensors when the optical sensors are located close to one another.

Although the paper detection apparatuses using the optical sensors are described in exemplary embodiments shown in FIGS. 4 through 10, the scope of the present invention is not limited by the type of sensor. For example, a photo interrupter (not shown) or a microswitch (not shown) having an actuator that moves in contact with paper can be used. Since the photo interrupter or microswitch is well known to those skilled in the art, a detailed description will be omitted for clarity and conciseness. In the exemplary embodiments shown in FIGS. 4 and 8 through 10, the light source 100, 101, or 102 does not need to be provided. In the exemplary embodiments shown in FIGS. 4, 8, and 9, a plurality of photo interrupters or microswitches are installed instead of the sensors 201-209 and 202*a*-209*a*. In the exemplary embodiment shown in FIG. 10, a plurality of photo interrupters or microswitches is installed instead of the optical fibers 401-409 and 402*a*-409*a*.

As described above, the paper detection apparatus and the printing method according to exemplary embodiments of the present invention has the following advantages.

The size of paper can be detected using a single light source and a single optical sensor. Also, the cost of the paper detection apparatus is reduced, since an optical sensor, having a small light detection angle range, and a light source, having a relatively smaller light amount, can be used. Further, a printer can be designed more freely, since there is no limit in the installation of the light source and the optical sensor.

Printing errors due to a mismatch between the paper size and image size or the skew of paper can be prevented, since the paper transfer method, the paper size, and the skew of paper are detected.

While this invention has been shown and described with reference to certain exemplary embodiments thereof, it will be understood by those skilled in the art that various changes in form and details may be made therein without departing from the spirit and scope of the invention as defined by the appended claims.

What is claimed is:

1. A paper detection apparatus for detecting a size of a sheet of paper transferred along a paper transfer path, the paper detection apparatus comprising:

a light source;

an optical sensor;

a feeding method detection sensor located close to a reference edge of a paper transfer path for detecting whether the sheet of paper is transferred in a side feeding method or a center feeding method, according to whether the paper transferred along the paper transfer path is detected;

a plurality of light emitting optical fibers located at a first side of the paper transfer path for receiving light radiated by the light source and emitting the received light to a plurality of positions in a widthwise direction of the paper;

a plurality of light receiving optical fibers located at a second side of the paper transfer path for guiding the light emitted by the light emitting optical fibers toward the optical sensor; and a determination unit for detecting the size of the paper based on the amount of light detected by the optical sensor.

2. A paper detection apparatus comprising:

a feeding method detection sensor located close to a reference edge of a paper transfer path for detecting whether a sheet of paper is transferred in a side feeding method or a center feeding method, according to whether the paper transferred along the paper transfer path is detected;

a plurality of first sensors for detecting the size of the paper transferred in the side feeding method; and a plurality of second sensors for detecting the size of the paper transferred in the center feeding method.

3. The paper detection apparatus as claimed in claim 2, wherein the feeding method detection sensor is located outside a second edge of the paper, wherein the paper comprises a maximum size and is transferable in the center feeding method, and the second edge is an edge of the paper close to the reference edge.

4. The paper detection apparatus as claimed in claim 3, wherein the plurality of first sensors are located inside a first edge of the paper transferred in the side feeding method, and the plurality of second sensors are located inside the second edge of the paper transferred in the center feeding method, and the first edge is an edge of the paper opposite to the reference edge.

5. The paper detection apparatus as claimed in claim 4, further comprising:

a plurality of third sensors located outside the first edge of the paper transferred in the side feeding method, forming a pair with the first sensors; and a plurality of fourth sensors located outside the second edge of the paper transferred in the center feeding method, forming a pair with the second sensors, wherein a skew of the paper is detected based on a change in the paper detection of the first, second, third, and fourth sensors, while the paper is transferred.

6. The paper detection apparatus as claimed in claim 5, wherein a distance from the first edge to the first and third sensors and a distance from the second edge to the second and fourth sensors comprise an allowable amount of the skew of the paper.

7. The paper detection apparatus as claimed in claim 5, further comprising at least one light source for radiating light onto a surface of the paper, wherein the feeding method detection sensor and the first, second, third, and fourth sensors are optical sensors located on a rear surface of the paper to detect the light.

8. The paper detection apparatus as claimed in claim 7, further comprising a plurality of optical fibers having one end portion connected to at least one light source and another end portion located to face the feeding method detection sensor and the first, second, third, and fourth sensors.

9. The paper detection apparatus as claimed in claim 8, wherein the light source comprises a plurality of light sources which radiate light through a light input portion of each of the optical fibers.

10. The paper detection apparatus as claimed in claim 5, wherein the feeding method detection sensor and the first, second, third, and fourth sensors are optical sensors located on a rear surface of the paper, and further comprising a plurality of light sources located to face the feeding method detection sensor and the first, second, third, and fourth sensors, and radiating light onto a surface of the paper.

11. A paper detection apparatus comprising:

at least one light source for radiating light onto a surface of a sheet of paper;

a feeding method detection optical fiber having a light input portion that is located close to a reference edge of a paper transfer path on a rear surface of the paper; and a feeding method detection optical sensor connected to a light output portion of the feeding method detection optical fiber for detecting whether the paper is transferred in a side feeding method or a center feeding method.

12. The paper detection apparatus as claimed in claim 11, wherein the light input portion of the feeding method detection optical fiber is located outside a second edge of the paper, wherein the paper comprises a maximum size and is transferable in the center feeding method, and the second edge is an edge of the paper close to the reference edge.

13. The paper detection apparatus as claimed in claim 12, further comprising:

a plurality of first sensors detecting the size of the paper transferred in the side feeding method; and a plurality of second sensors detecting the size of the paper transferred in the center feeding method.

14. The paper detection apparatus as claimed in claim 13, further comprising:

a plurality of first optical fibers having light input portions located inside a first edge of the paper transferred in the side feeding method, the first edge being an edge of the paper opposite to the reference edge, and light output portions connected to the first optical sensors; and a plurality of second optical fibers having light input portions located inside a second edge of the paper transferred in the center feeding method and light output portions connected to the second optical sensors.

15. The paper detection apparatus as claimed in claim 14, further comprising a plurality of third and fourth sensors which form a pair with the first and second sensors and detect a skew of the paper.

16. The paper detection apparatus as claimed in claim 15, further comprising:

a plurality of third optical fibers having light input portions located outside the first edge of the paper transferred in the side feeding method and light output portions connected to the third optical sensors; and a plurality of fourth optical fibers having light input portions located outside the second edge of the paper transferred in the center feeding method and light output portions connected to the fourth optical sensors.

17. The paper detection apparatus as claimed in claim 16, wherein a distance from the first edge to the light input portions of the first and third sensors and a distance from the second edge to the light input portions of the second and fourth sensors comprise an allowable amount of the skew of the paper.

18. The paper detection apparatus as claimed in claim 17, further comprising a plurality of fifth optical fibers, each of the fifth optical fibers having a first end portion connected to the light source and a second end portion located to face the light input portions of the feeding method detection optical fiber and the first, second, third, and fourth optical fibers.

19. The paper detection apparatus as claimed in claim 18, wherein the light source comprises a plurality of light sources radiating light through the light input portions of the fifth optical fibers.

20. A paper detection apparatus for detecting a size of a sheet of paper transferred along a paper transfer path, the paper detection apparatus comprising:

a light source located at a first side of the paper transfer path;

a feeding method detection sensor located close to a reference edge of a paper transfer path for detecting whether the sheet of paper is transferred in a side feeding method or a center feeding method, according to whether the paper transferred along the paper transfer path is detected;

a plurality of optical sensors located at a second side of the paper transfer path and receiving light radiated by the light source; and a detection unit detecting the size of the paper based on an amount of light detected by the optical sensors.

21. The paper detection apparatus as claimed in claim 20, further comprising a plurality of light emitting optical fibers which guide the light radiated by the light source to each of the optical sensors.

* * * * *